3,426,904
SEPARATING APPARATUS FOR DISPERSED MATTER
Kihei Katsuta, Yoshikatsu Shimasaki and Ikuo Miki, Nagasaki-shi, Akira Imamura, Tokyo, and Hiroshi Oota and Takeshi Matsubara, Kitakyushu-shi, Japan, assignors to Mitsubishi Jukogyo Kabushiki Kaisha, Chiyoda-ku, Tokyo, and Kabushiki Kaisha Imamura Seisakusho, Kitakyushi-shi, Japan
Filed Dec. 21, 1965, Ser. No. 515,361
Claims priority, application Japan, Dec. 23, 1964, 39/72,236; Nov. 8, 1965, 40/68,436
U.S. Cl. 210—259            6 Claims
Int. Cl. B01d 21/02

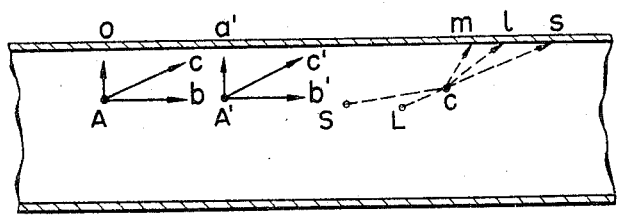
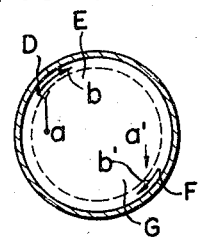
FIG. 1a  FIG. 1b
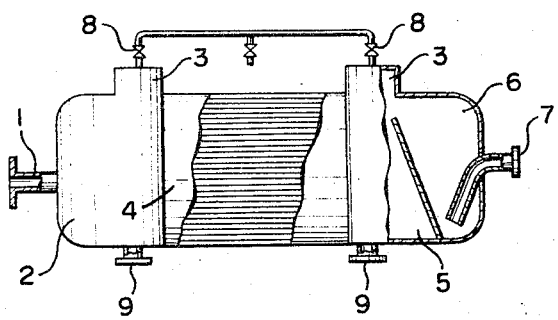
FIG. 2
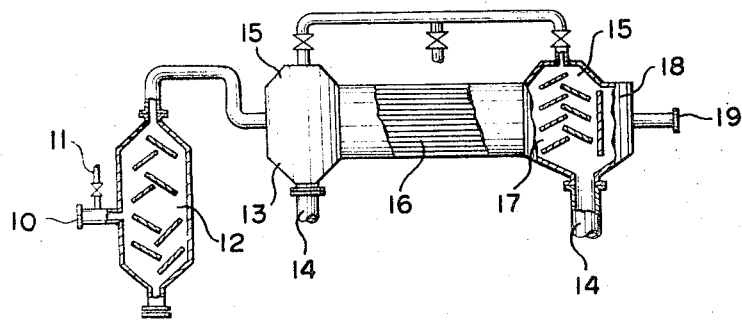
FIG. 3
INVENTORS
KIHEI KATSUTA, YOSHIKATSU SHIMASAKI
IKUO MIKI, AKIRA IMAMURA,
HIROSHI OOTA AND TAKESHI MATSUBARA
BY: McGlew and Toren
ATTORNEY

United States Patent Office 3,426,904
Patented Feb. 11, 1969

ABSTRACT OF THE DISCLOSURE

Separating apparatus for dispersed matter is disclosed as comprising a dispersed substance agglomerating chamber having a horizontal flow passage therethrough containing a packing of a plurality of relatively thin-wall tubes, each having a diameter not in excess of 10 mm., the packing substantially filling the transverse cross sectional area of the flow passage, with the tubes being in a laterally substantially contiguous relation and providing through flow passages therethrough and through the intertube spaces. The chamber has a dispersion inlet, a first outlet for a dispersion medium and a second outlet for dispersed substances separated and agglomerated during flow of the dispersion through and between the small diameter tubes. Further separating means communicate with the agglomerating chamber.

BACKGROUND OF THE INVENTION

This invention relates to separating apparatus and, more particularly, to novel and improved separating apparatus for efficiently and economically separating dispersed substances or dispersed matter from the dispersion medium of a dispersion.

Contamination or pollution of rivers and other streams, and of bodies of water, by oil and other wastes presents a serious social problem, necessitating increased attention to the problem of economical disposition of impurities in waste water discharged from industrial establishments or from ships. For example, water-borne transportation of oil has shown a substantial annual increase for years. It follows, naturally, that the quantity of oil discharged into the sea or other bodies of water at the time of cleaning oil tanks is constantly on the increase.

Although discharge of oil in harbors and the like is generally prohibited by law, such oil discharge is still permitted in most areas of the open seas. Nevertheless, and in view of the increasing damage due to pollution of water by discharge of waste either into streams or into the open seas, several international conferences have been held in an attempt to reach a mutually satisfactory agreement prohibiting discharge of oil into the open sea. One proposal resulting from these conferences is to restrict the oil concentration in waste water discharged into the open sea to under 100 p.p.m. However, there has not yet been made available separating apparatus which can separate the oil content from oily water to reduce the oil concentration to this value and which apparatus is inexpensive and adaptable to shipboard installation.

Furthermore, in areas where there is a concentration of chemical processing plants, a great quantity of oil and other pollutants mixed or dispersed in waste water is discharged into the sea or other bodies of water adjacent such industrial concentrations. The resultant pollution of the water has a very seriously damaging effect on fishing in the areas affected by the waste water discharge. In some cases the water has become so contaminated that it is no longer capable of supporting marine life such as scale fish, shell fish and the like. An additional result of such contamination and pollution due to industrial wastes is the prevalence of disagreeable odors in fish or the like taken from the contaminated water.

In an attempt to solve the problem of such increasing contamination and pollution of streams and other bodies of water, laws have been passed prohibiting the free discharge of untreated industrial waste water. Such laws generally restrict the permissible concentration of pollutants or contaminants in the waste water to a much greater extent than the restriction in the case of discharge from ships. Generally, the pollutant concentration in industrial waste water is restricted to less than about 10 p.p.m.

As a result of the problems and factors mentioned above, there is a great demand in many fields for apparatus which can efficiently separate oil from oil-water mixtures, pollutants and other impurities from factory discharge waste water, and similar contaminants from water discharged into streams and bodies of water, whereby the water finally discharged into the streams and other bodies of water is relatively pure or clarified. Several types of separating apparatus have been proposed for land-based installations, but those hitherto proposed or used require a very large area for installation and are ineffective to handle the separation of large quantities of oily water or industrial waste.

The present invention is directed to apparatus for efficiently separating dispersed substances or dispersed matter from the dispersion medium of a dispersion. More particularly, it is directed to such a separation apparatus wherein a liquid mixture, comprising components having different specific gravities or a liquid having a small quantity of solids dispersed therein, other liquid mixtures, or mixtures of solid components mixed and dispersed in a liquid and having a different specific gravity from the mixture, may be efficiently separated. By the term "dispersion" as used hereinafter is meant not only a liquid dispersion containing a single dispersed substance, but also a liquid system wherein the dispersion contains a plurality of dispersed substances which may be either liquids, or solids, or both. The term also involves the case where the specific gravity of the dispersed substances is lower than that of the dispersion medium.

Accordingly, an object of the present invention is to provide apparatus which can separate dispersed substances from a dispersion medium wherein the dispersed substances are dispersed in the form of extremely fine dispersed particles.

Another object of the invention is to provide such an apparatus wherein the separation of the dispersion into dispersed substances and the dispersion medium per se is effected rapidly and at a high rate.

A further object of the invention is to provide such an apparatus which is compact and requires only a very small area for installation, despite its high efficiency and high rate of separation.

Yet another object of the invention is to provide separating apparatus for separating dispersed substances from the dispersion medium of a dispersion and including an agglomerating chamber packed with a plurality of thin-walled tubes arranged in the flow path through the chamber so as to extend parallel to the direction of flow of the dispersion through the chamber.

Yet a further object of the invention is to provide a separating apparatus for separating dispersed substances from the dispersion medium of a dispersion in which the fine dispersed substances in the dispersion medium are discharged into an agglomerating chamber where the dispersed substances are agglomerated.

Conventional techniques for separating dispersed substances from the dispersion medium of a dispersion include a method wherein the dispersion, in liquid form, is passed through a filtration tank packed with filtering mediums so as to permit the fine dispersed substances to be deposited on the filter mediums, thereby filtering the dispersion. However, according to this known technique the filter mediums or bodies are packed randomly in the filtration tank and, consequently, the interspaces between the filter mediums and through which the dispersion flows are non-uniform. As a result, the velocity of the liquid dispersion passing through these spaces is subject to a wide variation, thus causing a great loss of kinetic energy of the liquid dispersion and producing a very large flow resistance. As a result in this known technique, it is necessary to supply the dispersion liquid to the filtration tank under pressure. This is necessary because of the fact of the pressure loss amounts to as high as 1–2 kg./sq. cm., so that it is not possible to impart sufficient energy thereto to flow through the filtration tank only by the force of liquid suction at the discharge side of the tank. It is therefore necessary to deliver the dispersion liquid to the tank under positive pressure by means of a pump. It naturally follows that, during passage of the dispersion through the pump, the dispersion is violently agitated giving rise to further decrease in the size of the dispersed substances making it more difficult to effect their separation from the dispersion liquid. As a result, the separation effected by this known technique is of very poor quality.

Conversely, in the procedure of the present invention using an agglomerating chamber provided with a plurality of thin-walled tubes arranged in the flow path so as to extend parallel to the liquid flow, the interspaces through which the liquid dispersion flows are uniform throughout the chamber. The result is that there is only a very small flow resistance. An additional advantage of the present apparatus is that the flow resistance in the flow passages does not increase during operation.

Furthermore, since the agglomerating chamber is so constructed that the liquid can flow both through the tubes and between the exterior surfaces of contiguous tubes, the cross sectional area of the flow passage is much greater in comparison with the cross sectional area of the flow passages of conventional separation apparatus using spherical or rod-type filter bodies in fibrous form, and which are packed into a filter chamber so that the liquid dispersion must flow in the passages formed between the outer surfaces of the filter bodies. Consequently, for the same rate of separation, the apparatus of the present invention can be made very much smaller and even, in effect, miniaturized.

For an understanding of the principles of the invention reference is made to the following description of typical embodiments of the invention as illustrated in the accompanying drawings.

In the drawings:

FIGS. 1a and 1b are somewhat diagrammatic sectional views illustrating the principles of the agglomerating action of a thin-walled tube used in the agglomerating chamber of the separating apparatus of the invention;

FIG. 2 is a somewhat diagrammatic side elevation view, partly broken away, of one embodiment of separating apparatus in accordance with the present invention;

FIG. 3 is a view, similar to FIG. 2 of another embodiment of separating apparatus of the invention;

Figure 4:
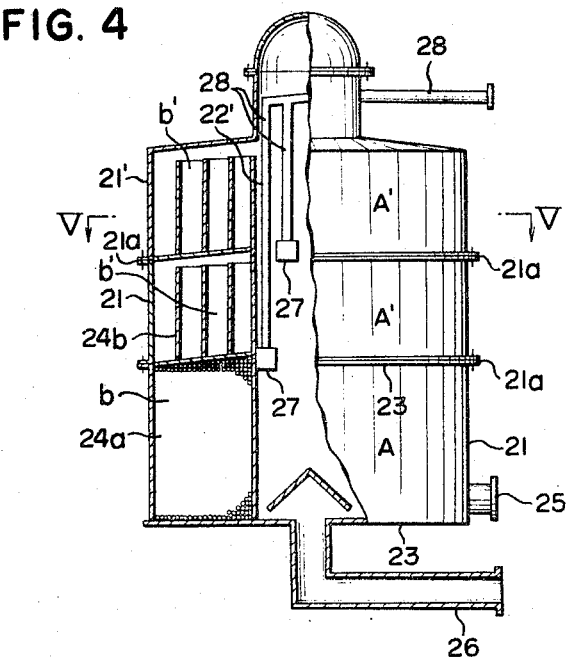
FIG. 4 is a somewhat diagrammatic elevation view, partly broken away, of still another embodiment of separating apparatus in accordance with the present invention.

In advance of discussing the detailed construction of the separation apparatus of the invention, the principle of the separating operation in the agglomerating chamber of the apparatus will be explained with particular reference to FIGS. 1a and 1b.

Referring first to FIG. 1a, the agglomerating chamber of the apparatus is filled with thin-walled tubes arranged parallel to the flow direction, and FIG. 1a shows, as an example of such relatively small diameter tubes, a circular cross section tube in axial section. It is generally known that the separation of dispersed substances from the dispersion medium of a dispersion is greatly facilitated by the provision of surfaces that will interrupt the flow of the separated dispersed substances. In the prior art method mentioned above, many of these surfaces are provided to interrupt the flow of the dispersion, but the prior art techniques have disadvantages which detract greatly from their practical use.

However, by using the very small diameter tubes in the agglomerating chamber of the present apparatus, it is possible to effect separation over an extremely small separation distance, as indicated by the upwardly directed arrows in FIG. 1a. Furthermore, not only can the interior surfaces of the tubes be used as separation surfaces, but also the exterior surfaces of the tubes form such separation surfaces as the external surfaces of adjacent tubes define further flow passages which are exterior to the tubes. Additionally, since the pressure of the liquid is equalized with respect to the interiors and exteriors of the tubes, the material of the tube does not have to have a great strength, so that an exremely thin-walled tube can be used.

In the case where the dispersed substance is lighter in weight than the disperison medium so that the separated dispersed substance floats, the separation of the dispersed substance is conducted, as seen in FIG. 1a, in the following manner. The particle A or A' floats in the direction and at the velocity indicated by the arrows or vectors $c$, $c'$, respectively, which vectors represent the resultants of the difference between floating velocity $a$, $a'$ based on the particle diameter and the linear flow velocity $b$, $b'$ at the particular location. Thereby, the particles A, A' are separated as indicated in FIG. 1a. The floating particles are deposited on the surfaces of the tubes and form an oil film thereon. This oil film traps further oil particles which float and therefore further facilitates the separation procedure.

In the mentioned case, the floating particles, floating upwardly toward the tube wall surfaces, collide with other particles with which they unit or coalesce to form larger particles whose velocity is increased so that they contact the tube walls at a higher rate of speed. Thus, particle S having a small diameter, is deposited on the tube wall at the point $s$, while particle L, having a larger diameter, is deposited on the tube wall at point $l$. When the particles collide, as at point C, and unite to form a larger particle, this larger particle is separated at an increased velocity and is deposited at the point $m$.

The smaller the diameter of the individual tubes in the tube group, and the greater the tube length and the smaller the flow velocity, then the more effective is the separating action. As a result of experiments, it has been found that the liquid concentration C in the lower portion of the flowing dispersion, as compared with the component liquids having a small specific gravity, can be expressed by the following formula:

$$C = C_0 10^{-axb}$$

In this equation, $x$ is the length measured along the direction of flow through the flow passage, $a$ is the sum of the lengths of segments of the tube per unit area along a cross section perpendicular to the direction of the flow passage and contacted by the dispersion, $C_0$ is the liquid concentration as compared to the component liquids of small specific gravity at the cardinal point in the flow passage, and $b$ is a constant determined by such factors as the components of the dispersion, the quality of the tube, etc.

From the above empirical formula, it will be noted that the greater the length of the flow passage, the smaller the concentration C of the lower portion of the flow path compared to the component liquids having a small specific gravity, which facilitates the separation. Furthermore, it will be noted that the more densely the tubes are packed across the cross section of the flow passage, the greater is the concentration C. Consequently, by providing thin-walled long tubes, it is possible to construct the apparatus to have a high efficiency of separation while being even more compact in size.

The dispersed substances adhering to the tube walls, if they are liquid substances, cohere with each other and move in the flow direction to form a thin filmy stream along the tube wall until the cohered substance is finally torn off the wall in the form of a very large diameter particle at the exit end of the flow passage. It has also been confirmed, in accordance with the present invention, that the same agglomerating action takes place when the dispersed substances are solids, the solids either being floated or precipitated from the terminal end of the flow passage.

Furthermore, it has been found that, at a cross section perpendicular to the flow direction, floating dispersed substances move upwardly along the circular periphery of the tube, while precipitated dispersed substances move downwardly along the circular periphery of the tube.

Referring now to FIG. 1b illustrating the separating action in a small diameter thin-walled tube in accordance with the invention, $a$ and $a'$ illustrate the projected motions of dispersed substances which are floated or precipitated, respectively. The motion of small particles of the dispersed substances, separated from the dispersion medium, is indicated at D and F. As there is a difference in specific gravity between small particles of the dispersed substances, as indicated at D or F, and the dispersion medium E or G above or below the substances D or F, the particles D move upwardly as indicated by arrow $b$ and the particles F move downwardly, as indicated by the arrow $b'$. Thus, the separation of the dispersed substances from the dispersion medium is enhanced as a very important feature of the invention.

Specifically, one of the most important features of the present invention is that each tube in the agglomerating chamber has a continuous surface or surfaces which interrupt flow of the separated dispersed substances in both the upward direction and the downward direction. This surface promotes the separation of the dispersed substances and their cohesion with each other.

Consequently, in accordance with the invention, it is possible to effect a desirable separation, by the agglomerating procedure, of an extremely fine dispersion, such as a so-called emulsified dispersion by appropriately selecting the diameters and lengths of the tubes.

The apparatus of the present invention will now be described in greater detail in accordance with specific examples.

Example I

FIG. 2 illustrates an example in which a sample of oily water, discharged by a ship as a dispersion, was passed through a separator embodying the invention. The dispersion, such as oil-polluted water, is introduced into the apparatus through an inlet 1 and passes first into a primary gravity separation tank 2 where those oil particles having relatively large diameters are separated from the dispersion by virtue of the difference in specific gravity between the large particles of oil and the water constituting the dispersion medium. The separated relatively large diameter oil particles move upwardly and are collected in a separated oil storage dome or compartment 3. Conversely, those substances having a relatively large specific gravity such as mud, sand, metal powder, and the like are precipitated to the bottom of the primary gravity separation tank. The dispersion or polluted water then flows to the agglomerating chamber 4 which is densely packed with small diameter thin-walled tubes of vinyl chloride, each tube having a diameter of 5 mm. and a length of 3 m. and the tubes extending parallel to the direction of flow. Chamber 4 is circular in cross section.

Various materials may be used for the capillary tube group, such as synthetic resins, metals and other similar materials in accordance with the desired uses. The tube diameter is less than 10 mm. and usually about 5 mm. However, in some specific cases, such as described in Example II below, the tube diameter is less than 2 mm. The tube wall need have only the minimum thickness necessary for self-support of the tube. The tube length is determined in accordance with the concentration of the dispersed substances in the dispersion, as well as in accordance with the greatly reduced concentration desired after separation. In some instances, it is necessary to combine two or more agglomerating chambers and to provide a storage or idle area between each chamber to facilitate discharge of the separated substances to the exterior of the apparatus.

From the agglomerating chamber or chambers 4, the dispersion flows to the secondary gravity separation chamber 5 where the dispersed substances, separated and agglomerated in the agglomerating chamber and discharged from the terminal ends of the tubes in the form of a large diameter particle, are subjected to gravity separation effected by the difference in specific gravity between water and oil. The separated oil is collected in a second oil storage dome or compartment 3. The relatively purified water is delivered to a compartment 6 from which the treated water may be discharged through an outlet 7. The separated oil is removed through an oil discharge line or tube 8. A small amount of mud, sand, metal powder, and other solid substances, constituting sludges, which are accumulated on the bottoms of the primary and secondary gravity separation tanks may be removed through manholes 9 at the bottom of each compartment or tank. If necessary, it is also possible to form the sludges into a slurry and thereby effect continuous discharge in an automatic manner.

Aboard ship it is common practice to deliver oily water to be separated to the separating apparatus by means of pumps. This results in the oily water attaining a state wherein separation is extremely difficult as mentioned above. However, the separating apparatus of the invention has a very high separating efficiency as indicated in Table I below.

TABLE I

| Kind of oil mixed | Inlet oil concentration (p.p.m.) | Amount to be treated [1] (tons/hr.) | Outlet oil concentration (p.p.m.) |
|---|---|---|---|
| (A) Heavy oil | 10,000 | 25 | 6 |
| Do | 30,000 | 25 | 53 |
| (C) Heavy oil | 10,000 | 25 | 12 |
| Do | 5,000 | 50 | 35 |

[1] This apparatus is designed to have a capacity of 25 tons/hr.

From this table it will be noted that the separating apparatus of the invention is not only able to maintain the concentration at its outlet at a value far smaller than the 100 p.p.m. usually obtained when discharging oily-water from ships, but also to have a very high efficiency of separation when the apparatus is operated at double its rated capacity in the event that the type of oil and the mixing conditions are suitably selected. This is a very notable increase in efficiency as compared with conventionally marketed oil and water separating apparatus. In the latter the treatment efficiency is only a minor fraction of the efficiency of the present apparatus and, moreover, the oil concentration in the liquid after separation is still above 100 p.p.m.

Example II

FIG. 3 illustrates an embodiment of the invention utilized to treat wastes from land based installations. The waste water is delivered to the apparatus through the inlet 10 of a preset clarifying tank 12 having a second inlet 11 through which coagulants may be introduced when necessary. The effluent of tank 12 is delivered to the primary separation tank 13 having a bottom outlet 14 for removing heavy separated substances. The upper end of tank 13 is formed with a compartment 15 in which there is collected the lighter weight separated substances such as oil.

From tank 13 the dispersion flows to the agglomerating chamber 16 which is packed with vinyl chloride tubes having a diameter of 2 mm. After passing through the flow path provided in the chamber 16, the dispersion medium and the separated dispersed substances are discharged into a secondary gravity separation tank 17 whose construction is similar to that of the tank 13, being provided with a bottom outlet 14 for heavier separated substances and a compartment 15 for collecting the lighter separated substances. The treatment water is delivered to the tank 18 and may be discharged therefrom through a treated water outlet 19.

In an experiment using the apparatus of FIG. 3, industrial waste containing about 300 p.p.m. of oil and precipitates discharged from a crude oil dechlorination installation in a petroleum refinery was treated. The treated water obtained from the outlet 19 contained 1.5–2 p.p.m. of oil. This particular industrial waste was one which formed an emulsion of such extraordinary obstinacy that the dispersed substances could not be separated at all by conventional apparatus.

In still another experiment using the apparatus of FIG. 3, extremely dirty foul water was treated with the result that clean water, of very high transparency, was obtained after about five minutes residence time in the apparatus.

By contrast the same water which was not treated by the apparatus but allowed to remain stationary or to settle for five minutes remained as muddy water with no precipitate whatsoever.

In the embodiment of the present invention illustrated in FIGS. 4, 5, 6 and 7, the apparatus comprises a unit or cell A, constituting an agglomerating chamber $b$, upon which are superposed two units or cells A' constituting separating chambers $b'$. The cells or units A and A' have a height selected in accordance with the desired capacity of the apparatus, and are separated by annular partitions 23 extending between outer cylindrical wall 21 and inner cylindrical wall 22, which are concentric about the same vertical axis. The bottom partition 23 is substantially planar, whereas the three upper partitions 23 are frusto conical, sloping upwardly and inwardly from the outer cylindrical wall 21 to the inner cylindrical wall 22. Each of the cells or units A' is provided with vertically oriented, radially spaced, circular partitions 24b which are concentric or coaxial with the cylindrical walls 21 and 22.

The cells are superposed with the cells A' as the uppermost stages. Outer walls 21 are provided with radial flanges 21a at their upper and lower stages, these flanges extending outwardly whereby the several cells may be secured together by bolting of superposed flanges 21a. The lower partition 23 of each of the units A' is formed with an inlet aperture 23a therethrough adjacent one side of a partition 23b extending radially thereof between the inner and outer walls 22 and 21. Similarly, the upper partitions 23 of each of the units A and A' is formed with an aperture 23a adjacent the opposite surface of the radial partition 23b. Apertures 23a form flow passages interconnecting the cells A and A' in succession.

Figure 5:
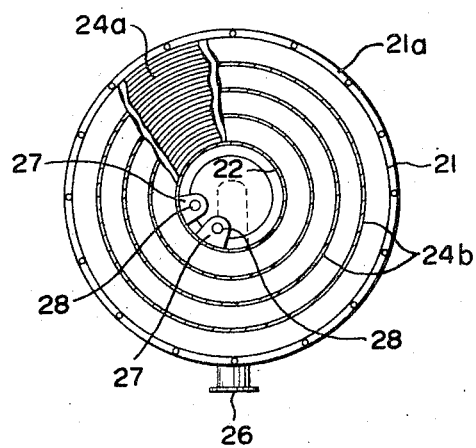
FIG. 5 is a transverse sectional view taken along the line V—V of FIG. 4.
Figure 6:
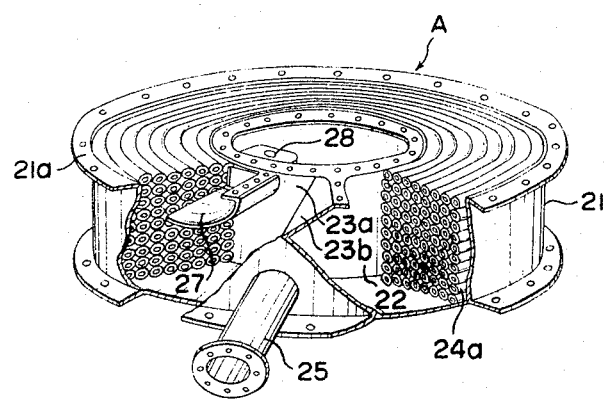
FIG. 6 is a perspective view, partly broken away, illustrating the details of a lower unit of separating apparatus of the embodiment of the invention shown in FIGS. 4 and 5.

Referring particularly to FIGS. 4, 5 and 6, the lowermost unit or cell A is provided with a plurality of closely packed, small diameter, thin-walled tubes 24a of vinyl chloride arranged in rows extending both vertically and radially of the annular chamber formed by the inner and outer walls 22 and 21. Tubes 24a extend circumferentially of agglomerating chamber $b$. A dispersion or liquid mixture inlet 25 communicates with chamber $b$ on the opposite side of partition 23b from the aperture 23a.

Figure 7:
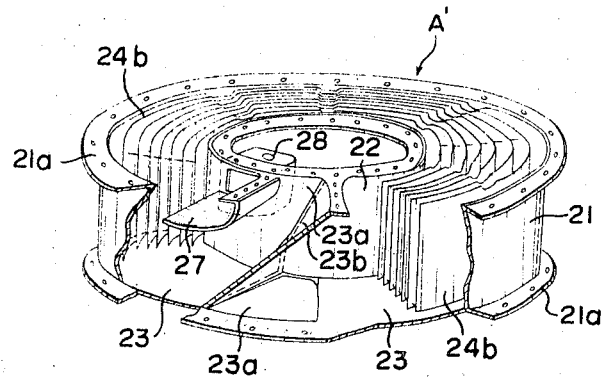
FIG. 7 is a view, similar to FIG. 6 of an upper unit of the separating apparatus shown in FIGS. 4 and 5.

As best seen in FIG. 7, the upper cells A' are provided, as stated, with the cylindrical plates or partitions 24b which may be made of metal, synthetic resin or other suitable selected material and which serve as means for regulating the liquid flow through the units A' and thus form separating chambers $b'$. A discharge or exhaust line 26 extends from a substantially axial or central opening in the lowermost partition 23.

The dispersion to be separated is pumped into the inlet 25, from which it flows through the tubes 24a and exits through the aperture 23a, in partition 23 at the upper end of chamber A, into the chamber A'. The liquid then flows circumferentially between the separating plates 24b in the chamber $b'$, and flows out through the aperture 23a in the upper partition 23 of the lower unit A', which is the lower partition of the uppermost unit A'. It should be noted that, with respect to each unit A', the aperture 23a in the lower partition 23 is on the opposite side or to the right of the radial partition 23b from the aperture 23a in the upper partition 23 thereof.

The liquid remaining after separation of the dispersed substances of relatively small specific gravity overflows over the upper edge of the inner wall 22 of the uppermost unit A' from the chamber $b'$ and then flows downwardly through the inner cylindrical wall 22 for discharge through the exhaust or discharge line 26.

The oil or other low specific gravity pollutants separated from the dispersion in each of the cells A and A' flows radially inwardly through gates 27 at the upper edges of the inner cylindrical walls 22 of each of the units and through pipes 22' extending upwardly through the inner cylindrical walls 22 and connected into an oil or pollutant discharge pipe 28.

In the same manner as in the embodiments of the invention previously described, the dispersion to be separated initially passes through the tubes 24a in the chamber $b$, and through the spaces between these tubes, whereby the fine-grained and uniformly dispersed liquid particles are agglomerated by the action along both the inner and outer surfaces of the tubes 24a in the manner previously described. The agglomerated particles are separated due to the difference in specific gravity and flow off through the discharge gates 27 at the upper end of the agglomerating chamber $b$ in cell A. The pollutants flow through the exhaust tube 28 while the liquid, having a greater specific gravity, flows into the chamber $b'$ in the next upper unit cell A' through the apertures 23a and is separated into upper and lower layers in the chamber $b'$. In the same manner as already described, the liquid having the smallest specific gravity is again discharged through the discharge gate 27 of a chamber A' but the liquid having the larger specific gravity overflows from the top edge of the inner cylinder 22' in the uppermost unit of cell A' and then flows down through the inner cylinders 22 for discharge through the exhaust tube 26. Solids having a large specific gravity, such as sand and the like, and which are included in the dispersion, remain deposited on the bottom wall of the uppermost unit or cell A'.

With the described apparatus it is possible to deliver dispersions continuously to the apparatus for separation of the lighter dispersed substances in the unit cell A, with further separation occurring in the unit cells A'. The separation is effected by differences in the specific gravity of the fractions, with one of the separated component liquids flowing into a clean liquid flow passage provided in the inner cylinders 22. The separation of the liquid components, by the differences in specific gravities, is effected in each of the units A and A'. With the invention apparatus it is also possible to effect continuous separation of dispersed or emulsified uniformly mixed liquids very easily and economically as well as efficiently. Furthermore, the invention apparatus though very compact can separate liquids at a very high rate.

Although, in the embodiments mentioned, only circular cross section tubes are illustrated by way of example, it should be understood that the tubes in the agglomerating chambers need not necessarily be limited to a circular cross section. The separating apparatus of the invention is very effective for separating dispersions by floating or precipitation separation, irrespective of the type of liquid involved. The apparatus can therefore be used for sequential or successive operation and, particularly, will allow miniaturization of such chemical apparatus as precipitation tanks, cleaning tanks, etc., which, in conventional techniques, have had to be of relatively large size.

While specific embodiments of the invention have been shown and described in detail to illustrate the application of the principles of the invention, it will be understood that the invention may be embodied otherwise without departing from such principles.

What is claimed is:

1. Separating apparatus, for separating dispersed substances from the dispersion medium of a dispersion, comprising, in combination, means forming at least one dispersed substance agglomerating chamber having a horizontal flow passage therethrough; a plurality of relatively thin-walled tubes, each having a diameter not in excess of 10 mm., substantially filling the transverse cross sectional area of said flow passage and extending parallel to the direction of flow along said flow passage; said tubes being in laterally substantially contiguous relation and providing through flow passages therethrough and through the inter-tube spaces; said chamber having a dispersion inlet, a first outlet for the dispersion medium, and a second outlet for dispersed substances separated and agglomerated during flow of the dispersion through said flow passage; and further separating means in communication with said agglomerating chamber, said further separating means including at least one gravitation separation chamber having a storage compartment at at least one of the upper and lower portions thereof to receive dispersed substances separated therein due to differences in specific gravity; said gravitation separation chamber being provided with storage compartments at both its upper portion and its lower portion, each storage compartment having an outlet therefrom.

2. Separating apparatus, for separating dispersed substances from the dispersion medium of a dispersion, comprising, in combination, means forming at least one dispersed substance agglomerating chamber having a horizontal flow passage therethrough; a plurality of relatively thin-walled tubes, each having a diameter not in excess of 10 mm., substantially filling the transverse cross sectional area of said flow passage and extending parallel to the direction of flow along said flow passage; said tubes being in laterally substantially contiguous relation and providing through flow passages therethrough and through the inter-tube spaces; said chamber having a dispersion inlet, a first outlet for the dispersion medium, and a second outlet for dispersed substances separated and agglomerated during flow of the dispersion through said flow passage; and further separating means in communication with said agglomerating chamber; said first separating means including a primary gravitation separation chamber and a secondary gravitation separation chamber, each of said gravitation chambers having a storage compartment at at least one of the upper and lower portions thereof for receiving dispersed substances separated therein by differences of specific gravity; said primary and secondary gravitation separation chambers being connected in communication with said agglomerating chamber in such a manner that the dispersion to be separated flows in series through said primary gravitation separation chamber, said agglomerating chamber and said secondary gravitation separation chamber in that order; each of said primary and secondary gravitation separation chambers being provided with a storage compartment at its upper end and a storage compartment at its lower end, each storage compartment having an outlet communicating therewith.

3. Separating apparatus, for separating dispersed substances from the dispersion medium of a dispersion, comprising, in combination, means forming at least one dispersed substance agglomerating chamber having a flow passage therethrough; a plurality of relatively thin-walled and small diameter tubes substantially filling the transverse cross sectional area of said flow passage and extending parallel to the direction of flow along said flow passage; said chamber having a dispersion inlet, a first outlet for the dispersion medium, and a second outlet for dispersed substances separated and agglomerated during flow of the dispersion through said flow passage; further separating means in communication with said agglomerating chamber; and means directing a liquid dispersion to flow helically upwardly through the flow passage in said agglomerating chamber; said chamber being defined by coaxial inner and outer cylinders arranged on a common upwardly extending axis; said second outlet communicating with said flow passage at the upper portion thereof; and means directing the dispersion medium in the upper portion of said flow passage to flow into the interior of said inner cylinder and downwardly therethrough; said first outlet communicating with the lower end of said inner cylinder.

4. Separating apparatus, as claimed in claim 3, wherein said further separating means comprises at least one additional chamber defined by said inner and outer cylindrical walls and separated from said agglomerating chamber by an annular partition; said first outlet comprising an aperture through said annular partition; said second outlet extending through said inner cylinder adjacent the upper end of said additional chamber.

5. Separating means, as claimed in claim 4, wherein each of said agglomerating chamber and said additional chamber is formed with a partition extending radially between said inner and outer cylinders; the first outlet of said agglomerating chamber extending through the separating partition adjacent one side of said radial partition and said first and second outlets communicating with the upper portion of said additional chamber adjacent the other side of said radial partition therein.

6. Separating apparatus, as claimed in claim 5, in which there are two additional separation chambers superposed one on the other and superposed on said agglomerating chamber; each of said chambers having a second outlet for dispersed substances separated and agglomerated therein communicating therewith through the inner cylindrical wall, and said second outlets being combined into a common outlet disposed above the uppermost additional separation chamber.

References Cited

UNITED STATES PATENTS

| 3,279,902 | 10/1966 | Gardner | 55—16 X |
| 3,294,504 | 12/1966 | Hicks | 55—16 X |
| 2,355,875 | 8/1944 | Lasseter | 210—522 X |
| 2,497,392 | 2/1950 | Breukel | 210—521 |
| 3,197,336 | 7/1965 | Diaz-Compain | 210—522 X |

FOREIGN PATENTS

| 55,765 | 9/1952 | France. |
| 994,118 | 11/1951 | France. |
| 382,711 | 11/1932 | Great Britain. |
| 645,710 | 11/1950 | Great Britain. |
| 746,980 | 3/1956 | Great Britain. |
| 186,088 | 11/1963 | Sweden. |

SAMIH N. ZAHARNA, *Primary Examiner.*

JOHN ADEE, *Assistant Examiner.*

U.S. Cl. X.R.

210—522